Figure 5:
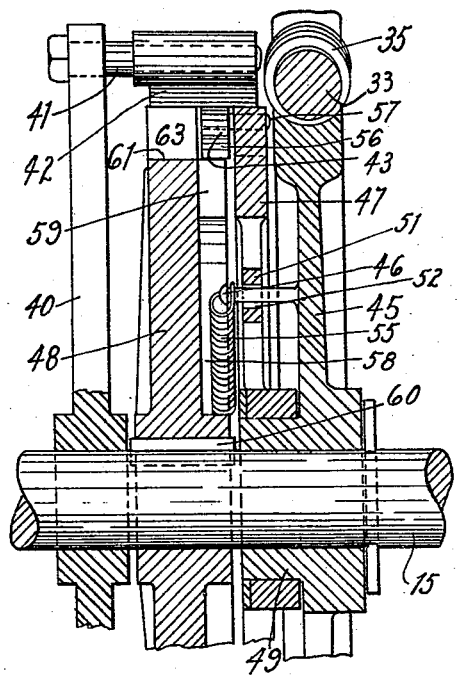

F. J. HEINE.
AUTOMATIC SHIFT.
APPLICATION FILED FEB. 5, 1921.
1,413,271.
Patented Apr. 18, 1922.
2 SHEETS—SHEET 1.
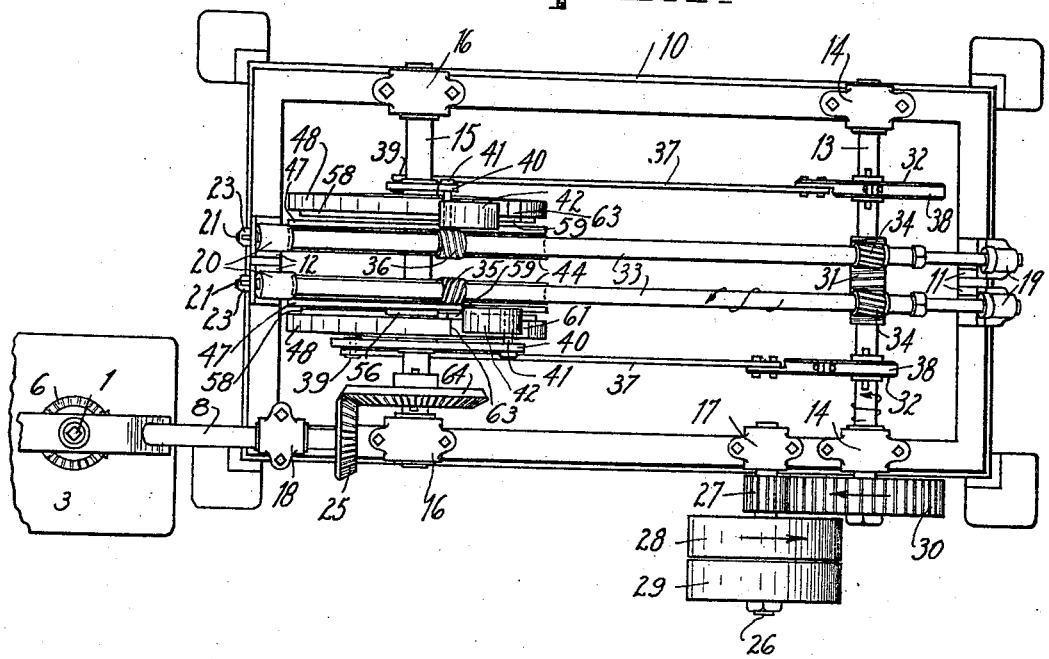
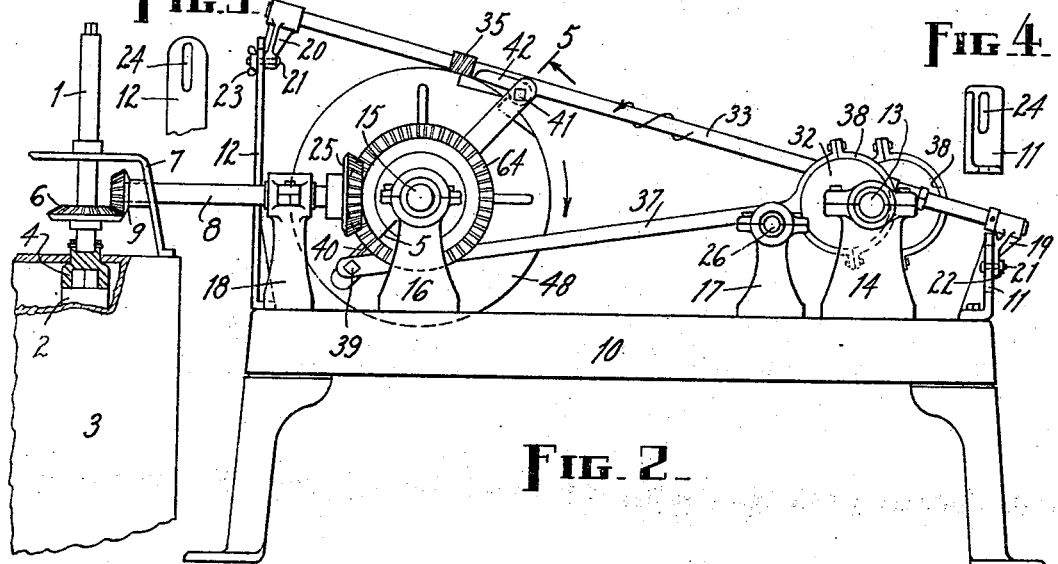
WITNESS:
C. C. West
INVENTOR.
Frederick J. Heine,
BY
Frank A. Cutter,
ATTORNEY.

F. J. HEINE.
AUTOMATIC SHIFT.
APPLICATION FILED FEB. 5, 1921.

1,413,271. Patented Apr. 18, 1922.
2 SHEETS—SHEET 2.

WITNESS:
C. C. West.

INVENTOR.
Frederick J. Heine,
BY Frank A. Cutter,
ATTORNEY.

UNITED STATES PATENT OFFICE.

FREDERICK J. HEINE, OF HUNTINGTON, MASSACHUSETTS.

AUTOMATIC SHIFT.

1,413,271.　　　　Specification of Letters Patent.　　Patented Apr. 18, 1922.

Application filed February 5, 1921. Serial No. 442,715.

*To all whom it may concern:*

Be it known that I, FREDERICK J. HEINE, a citizen of the United States of America, and a resident of Huntington, in the county of Hampshire and State of Massachusetts, have invented a new and useful Automatic Shift, of which the following is a specification.

My invention relates to improvements in machines for shifting automatically valves and other elements requiring to be changed in position or condition, and consists generally of normally-stationary rotative shifting members, constantly-oscillating shifting members, means intermittently or at predetermined intervals to connect first one and then the other of said oscillating shifting members with its companion rotative shifting member, timing members, constantly-rotating actuating members for said timing members, to drive the latter normally in opposite directions, the timing members being yieldingly connected with the actuating or driving members therefor, actuating mechanism for said oscillating shifting members, and operating mechanism between said rotative shifting members and the element to be shifted, together with primary driving mechanism, and such other parts and members as may be necessary or desirable in order to render the machine complete and serviceable in every respect, all as hereinafter set forth.

This automatic shift is designed more especially for Franklin process dyeing machines, and is shown and described in connection with the valve-stem of such a machine, but is adapted for use in connection with a two-way valve in any other type of machine, or with any other machine having an element capable of being shifted through the medium of my shift. Heretofore it has been necessary to have an operator to turn the two-way valve in a Franklin process dyeing machine, who, with watch in hand, first throws the valve in one direction and leaves it for a predetermined length of time, and then throws said valve in the opposite direction and leaves it for a predetermined length of time, repeating these operations indefinitely. This is all done automatically with the aid of my machine, so that the services of an operator for that purpose are no longer required.

The primary object of my invention is, as just intimated, to produce a machine or shift for throwing or operating, automatically, a two-way valve or other element, first in one direction and then in the other direction, and for doing so indefinitely, which shift is comparatively simple in construction and operation, readily attachable to or capable of being connected with the element to be shifted, and withal highly practicable and efficient.

Another object is to provide such a machine wherein may easily be changed the timing, or the length or lengths of the intervals between shifts of the valve or other element operated thereby.

Other objects and advantages will appear in the course of the following description.

I attain the objects and secure the advantages of my invention by the mechanism illustrated in the accompanying drawings, in which—

Figure 6:
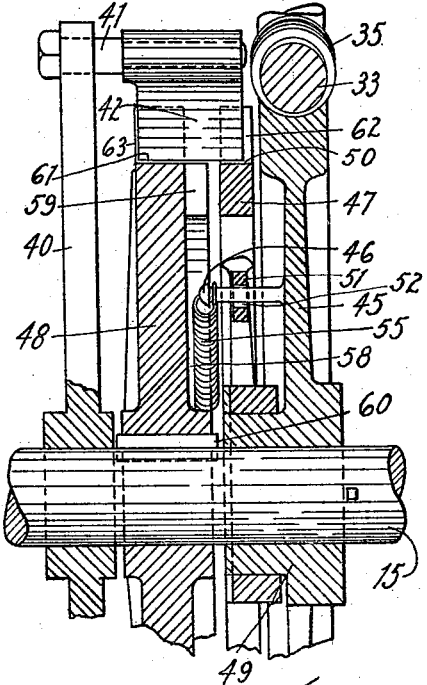
Figure 7:
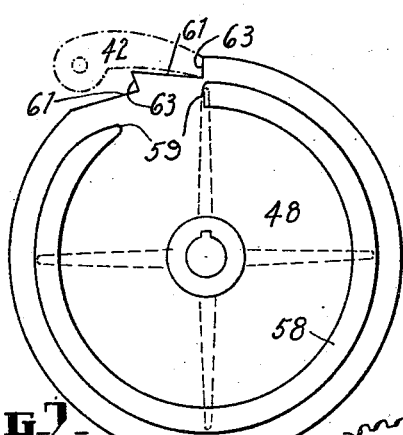
Figure 8:
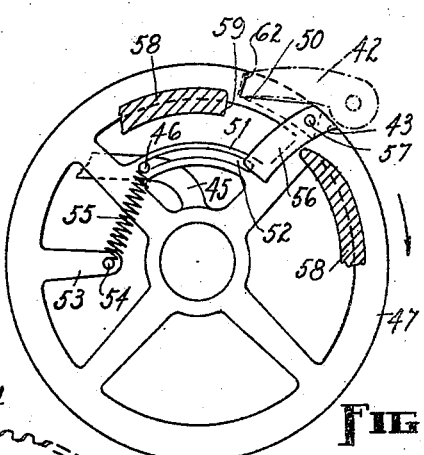

Figure 1 is a top plan of an automatic shift that embodies a practical form of my invention; Fig. 2, a side elevation of said shift, the primary or direct driving members being omitted; Fig. 3, a fragmentary detail of one of the brackets at the left-hand end of the machine; Fig. 4, an inside elevation of one of the brackets at the right-hand end of the machine; Fig. 5, a greatly enlarged, sectional detail through the front group of valve-shifting members, taken approximately on lines 5—5, looking in the direction of the associated arrow, in Fig. 2; Fig. 6, a similar detail but showing the members after the actual shifting operation has begun; Fig. 7, an enlarged inside elevation of the front, rotative, valve-shifting member or shifter; Fig. 8, an enlarged side elevation of one of what may be termed timers, the same being that which is on the corresponding side or in the same group with said shifter, certain associated parts being shown in fragmentary sections, and certain other associated parts also appearing so that the figure is an operative view, and, Fig. 9, an enlarged side elevation of the constantly-rotating driving member for said timer.

Similar reference characters designate similar parts throughout the several views.

For the purpose of this description the left-hand and right-hand ends of the machine are to be considered respectively as the front and back ends, and the side shown in Fig. 2 is to be considered as the front, while the opposite side is to be considered as the back.

In Figs. 1 and 2 is shown a vertical key 1 mounted on the stem 2 of a two-way valve (not shown) of a dyeing machine represented in part at 3, the key socket appearing in section at 4 in Fig. 2, and there being secured to said key above said socket a bevel-gear 6. A bracket 7 on the dyeing machine 3 assists in supporting and affords a bearing for the key 1, and also assists in supporting and affords a bearing for a horizontal shaft 8. Secured to the rear terminal of the shaft 8 is a bevel-gear 9 which intermeshes with the bevel-gear 6. Rotation of the shaft 8 in either direction is imparted, through the medium of the bevel-gears 9 and 6, to the key 1, and through the latter to the valve-stem 2, so that said stem can be actuated to throw its valve in alternate directions accordingly as said shaft is rotated. The shaft and the intermeshing bevel-gears are the only new members of those thus far described.

A suitably-supported oblong frame 10 is provided for the mechanism of this shift. A pair of short vertical brackets 11 are secured to the front end of the frame 10 in the center thereof, and a pair of long vertical brackets 12 are secured to the back end of said frame in the center thereof. A transverse shaft 13 is journaled in bearings 14—14 mounted on the front and back sides of the frame 10, adjacent to the front end of said frame; a transverse shaft 15 is journaled in bearings 16—16 mounted on said frame sides, adjacent to the rear end of said frame; a bearing 17 is mounted on the front side of the frame behind the front bearing 14, and a bearing 18 is mounted on the said front side behind the front bearing 16, the axis of said last-named bearing being at right-angles to the axis of each of the others of said bearings. There are a pair of bearings 19 attached to the brackets 11, and a pair of bearings 20 attached to the brackets 12, two pairs of bolts 21, a pair of nuts 22, and a pair of thumb-screws 23 being provided with which to secure said bearings to said brackets, and there being vertical slots 24 in said brackets to receive said bolts and enable them to be adjusted at higher and lower elevations, and with them the bearings.

The forward terminal portion of the shaft 8 is journaled in the bearing 18, and there is a bevel-gear 25 on such terminal portion. A short shaft 26 is journaled in the bearing 17 and extends forwardly therefrom, and secured to this shaft is a pinion 27 and a pulley 28. There is also a loose pulley 29 on the shaft 26. The shaft 13, like the shaft 26, extends beyond the front of the frame 10, and secured on such protruding portion of said shaft 13 is a gear 30. The pinion 27 intermeshes with the gear 30. Thus it is seen that power applied to the pulley 28 drives the shaft 13, through the medium of the shaft 26, pinion 27, and gear 30. The pulleys 29 and 28, pinion 27, and gear 30 are omitted from Fig. 2, so that the parts and members behind will be brought into view.

Secured to the shaft 13 in the center is a worm 31, and also secured to said shaft are two eccentrics 32, one of said eccentrics being in front and the other behind said worm.

Extending longitudinally of the frame 1, but above and oblique to the same, are two shafts 33. These shafts are journaled side by side in the bearings 19 and 20, and have secured thereto worm-gears 34—34 which intermesh with the worm 31. Secured to the shafts 33, at the right of the vertical plane in which is located the shaft 15, are right- and left-hand worm-gears 35 and 36, respectively.

The pitch of either or both of the shafts 33 can be changed by adjusting the bearings 19 and 20 on the brackets 11 and 12, so that the worm-gears 34 can be changed for the purpose of driving from the worm 31 the shafts 33 at different speeds, or, in other words, for changing the speed of either or both of said shafts. Provision is thus made for changing the time of the parts and members driven by the shafts 33, since a smaller worm-gear 34 on either shaft 33 will cause said shaft to be driven faster, and a larger worm-gear thereon will cause the shaft to be driven slower.

Two rods 37 have their hubs 38 mounted on the eccentrics 32. The rods 37 extend to the left from the eccentrics 32, and the left-hand or rear terminal of each of said rods is pivotally connected, at 39, with the lower terminal of an oscillatory arm 40 loosely mounted on the shaft 15. The limits of movement of each arm 40 can be changed by the adjustment of the pivot 39 which connects the associated rod 37 with said arm, should adjustment of this character be required. The arms 40 extend in both directions beyond the shaft 15, and they with their actuating rods 37 are so proportioned that the upper terminal portions of said arms never pass beyond the vertical plane of said shaft. Pivotally connected at 41 with the upper terminal of each arm 40, on the inside thereof, is a pawl 42. The two pawls 42 are so arranged or positioned that their free ends are at the left of their pivoted ends, when each is viewed from its respective side of the machine.

Figure 9:
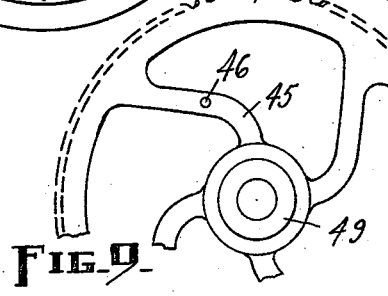

Loosely mounted on the shaft 15 are two worm-wheels 44. Said worm-wheels are located directly under the worm-gears 35 and 36, and intermesh with the latter. The worm-gear 35 drives the front worm-wheel 44 to the right, and the worm-gear 36 drives the back worm-wheel 44 to the left. Projecting outwardly from one of the spokes, as 45, of each worm-wheel 44 is a pin 46—see Figs. 8 and 9. The worm-wheels 44 are exactly alike, but the back worm-wheel is placed on the shaft 15 in reverse position relative to the front worm-wheel 44, so, also, with regard to a pair of timers 47, and a pair of rotative shifting members or shifters 48, the back timer being in reverse position relative to the front timer, and the back shifter being in reverse position relative to the front shifter. Consequently these members which are contained in the back group would appear, to one standing behind the machine, precisely as would the corresponding members contained in the front group, to one standing in front of the machine, and as shown in Figs. 2, 8, and 9, it being understood that there is a front group which is in a sense subject to the worm-gear 35, and a back group which is likewise in a sense subject to the worm-gear 36. The inner face of the shifter 48 is presented in Fig. 7. The arms 40 are the outside members and the worm-wheels 44 are the inside members of the two groups taken together while the timers 47 are nearest adjacent to said worm-wheels, and the shifters 48 nearest adjacent to said arm.

The arms 40 are shifting members and actuate the shifters 48, as will hereinafter be fully explained. When the machine is in action the arms 40 are caused to oscillate constantly by the eccentrics 32, but they impart to the shifters 48 only intermittent rotative movement, one shifter being partially rotated in one direction and the other shifter being partially rotated in the opposite direction, as will presently be made plain. The worm-wheels 44 have a constant motion, although in opposite directions, imparted thereto, by the worm-gears 35 and 36, when the machine is in operation.

Each timer 47 is in the form of a wheel, and is loosely mounted on the hub 49 of the contiguous worm-wheel 44, special reference now being had to Figs. 5, 6, and 8. In the periphery of the timer 47 is a recess or notch 50, and there is a segment 51 that connects two of the spokes of said timer, and has an arcuate slot 52 therein into which the pin 46 from the contiguous worm-wheel 44 projects, the ends of such slot forming stops to limit the movement of said pin independently of said worm-wheel, or the latter independently of said pin. The timer 47 is provided with an inwardly-projecting arm 53 from which extends a pin 54, said pin being parallel with the companion pin 46, and a spring 55 is attached at its ends to said pins. The parts are so located and positioned that normally the pin 46 is at the back end of the slot 52, in the direction of rotation of the worm-wheel 44, so that the timer 47 can, under force exerted thereon which is sufficient to overcome the resiliency of the spring 55, be rotated backwardly or in the direction opposite to that in which the worm-wheel is driven by its worm-gear, independently of said worm-wheel and while the latter continues to revolve, until the forward end of said slot encounters said pin. Upon the release of the timer the spring acts immediately to restore the timer to its former position relative to the worm-wheel, with the back end of the slot 52 in contact with the pin 46. Thus means is provided for carrying the timer around with the worm-wheel under normal conditions, but permitting said timer to be actuated in the opposite direction under certain other conditions.

Each timer 47 is further provided with a trip 56 which has one end pivoted at 57 to the rim of said timer, on the outer side thereof and so situated that it can be actuated into position to cover one side of the notch 50 in said rim, and have its then outer edge constitute a continuation of the periphery of the timer beyond both ends of said notch, although such continuation is offset. The means here provided for actuating the trip outwardly into closed position relative to the associated notch 50, and for maintaining said trip in such position for a predetermined length of time, consists of a flange 58 on the inner face of the adjacent shifter 48, which flange is annular and continuous except at one point wherein there is a break or recess, as shown at 59 in Figs. 5, 6, 7, and 8. The flange 58 is positioned to receive the trip 56 and support the same in closed or active position, until said trip arrives at the recess 59, when the trip swings downwardly into said recess and so uncovers or opens the notch 50. Then, upon further movement of the timer, the trip encounters the forward end, in the normal direction of rotation of said timer, of the flange 58 and rides onto the same again; and so is caused once more to cover or close said notch and to keep it closed until the trip arrives the next time at said recess. The recess 59 is at all times in a position which enables the trip 56 to swing downwardly on its pivot 57 by gravity into said recess.

Each shifter 48 is in the form of a disc, and is keyed at 60 to the shaft 15. There is the flange 58, of which mention has been made, on the inside of the shifter 48 and one or more recesses or notches 61, there being two in the present case, in the periphery of the shifter. The notches 61 form teeth, just as the notch 50 in each of the timers 47 forms a tooth. The tooth formed by the notch 50 is indicated at 62, and the teeth formed by the notches 61 are indicated at 63—63.

The diameters of the timers and shifters are all approximately the same. The pivots or studs 41 extend inwardly, from the arms 40, over the shifters 48 and the timers 47 in the two groups, and the pawls 42 are also of sufficient width to extend over said shifters and timers. The trips 56 are between the timers and shifters in the aforesaid groups.

The notches 61 being in the shifters 48 at the right of the vertical plane of the axis of the shaft 15, the teeth 63 are so arranged and located that they are engaged by the pawls 42, whenever said pawls are permitted to swing downwardly into said notches, the front shifter 48, when its teeth are engaged by the front pawl, being rotated to the left to the extent permitted by the throw in that direction of the upper terminal of the arm 40 carrying said pawl, which action rotates the back shifter 48 in the same direction, but without producing any other effect than to position said last-named shifter in readiness for its pawl to act on the same, and said back shifter, when its teeth are engaged by the back pawl, being rotated to the right to the extent permitted by the throw of the upper terminal of the arm 40 carrying said last-named pawl, which action rotates the front shifter in the same direction, but without producing any other effect than to position it in readiness for its pawl to act thereon again.

Each pawl 42 plays back and forth, as its arm 40 oscillates, over the notches 61 in the shifter 48 below, being held above said notches and the teeth 63 by the unbroken portion of the periphery of the timer 47 below, until the timer trip 56 arrives at the recess 59 in the flange 58 and swings downwardly into said recess, when said pawl, which at this time is supported at the free end by the trip, is permitted to swing downwardly on its pivot 41 into the notch 50, which has just been opened by said trip, and into the higher notch 61, said notch 50 at this time being in alignment with said higher notch 61, as the upper terminal of the arm carrying the pawl swings to the right, and then, as said arm swings the next time to the left, the pawl engages the tooth 62 and the higher or first tooth 63 and carries them and the members of which they are parts with it. Next the pawl is carried to the right again, when it clicks past the second tooth 63 and takes position in readiness to engage the same, which said pawl does on the next swing to the left of the upper terminal of the arm 40 carrying the pawl. When the pawl 42 makes its first active stroke said pawl actuates the timer 47 against the resiliency of the attached spring 55, carrying the pin 46 away from the left-hand end of the slot 52, consequently said spring acts, as soon as said pawl is retracted, to return said timer to its former position. This action locates the timer notch 50 beside the second shifter notch 61, since the shifter 48 has been moved ahead one notch by the pawl. Therefore, inasmuch as the stroke in either direction, of the end of the arm 40 with which the pawl 42 is connected, is greater than the movement of the timer 47 against the force of its spring, said pawl is able to take its position behind the second tooth 63 without being held up by the periphery of said timer at the left of the tooth 62. The flange recess 59 must, however, be long enough to enable the trip 56 to remain in operative position during the two operative strokes of the pawl 42. One tooth 63, on each shifter 48, would be sufficient, provided the strokes of the pawl were of sufficient length to bring about the required result. The two partial revolutions or pulsations imparted, in the manner first described, to one shifter 48 are sufficient to actuate the valve-stem key 1 the required distance in one direction, and two similar pulsations, except in the opposite direction, imparted to the other shifter 48 are sufficient to actuate said key the required distance in the opposite direction.

Next the pin 46 carried by the constantly-rotating worm-wheel 44, of the group involved in the actual shifting operation, encounters the leading end of the slot 52 in the segment 51 of the associated timer 47, in the normal direction of rotation of said timer, and causes said timer to be positively rotated by and with said worm-wheel, with the result that the trip 56, with which the timer is provided, is brought into contact with the now interposed end of the associated flange 58, and caused to ride onto said flange. This action on the part of the trip 56 causes said trip to encounter the pawl 42 above and thrust said pawl upwardly out of the recesses or notches 50 and 61. The spring 55, with which the timer 47 in question is provided, now acts to rotate said timer faster than the worm-wheel, until the rear end of the slot 52 contacts with the pin 46. This action restores normal relationship between the timer and the worm-wheel, and carries the periphery of the timer under the pawl, so that said pawl is prevented from encountering the teeth 63 until the timer has made another approximately complete revolution.

Thus it is seen that, whenever either trip 56 swings down into the recess 59 provided to receive it, the associated pawl 42 engages and actuates the associated shifter 48, and said shifter, operating through the medium of the shaft 15, to which it is keyed, a bevel-gear 64 secured to the front terminal of said shaft, the bevel-gear 25 with which said first-named bevel-gear intermeshes, the shaft 8, and the bevel-gears 9 and 6, causes the valve-stem key 1 to be actuated in one direction or the other, accordingly as it be the front or back trip involved; and that said key must remain in the last position or the position in which it is left at the end of the movement just imparted to it until the other trip 56 swings into the recess 59 provided for it, when the key is actuated in the opposite direction, in substantially the same manner as already explained, and must remain in the position wherein it is now left until the first trip 56 acts to bring about a repetition of the first operation. Indefinitely may the alternate shifting operations, with the intervals of rest, take place, so long as this machine is kept in motion.

The time which it takes for the trip 56 to reach the recess 59 in one group, after the trip 56 has permitted the pawl 42 in the other group to actuate the mechanism to throw the key 1, determines the interim of inactivity of said key, and the time which the valve operated by said key is permitted to remain open in one direction. Such time may be changed in length to suit different requirements. If it be desired to have the intervals between shifts of equal duration, the mechanism is set so as to locate the trips 56 diametrically opposite to each other, or in such a manner that, when one trip is diametrically opposite to the recess 59 in the supporting flange 58 for said trip, the other trip is in the recess 59 in the flange 58 for said last-named trip. By disengaging one or both of the worms 36 from the worm-wheel or worm-wheels 44 below, partially rotating one or both of the latter, with the timer or timers 47, on the shaft 15, to locate the two trips 56 closer together on one side of a diametral plane than on the other side thereof, and then reengaging the worm members, there will be alternately longer and shorter intervals between the movements imparted to the key 1. For example: The key might be permitted to remain in its left-hand position twice as long as in its right-hand position, and vice versa. Numerous other examples will readily occur to one skilled in the art. The adjustment to affect a change in the relative time of the movements in opposite directions imparted by the machine is made by changing the relative positions of the worm-wheels 44, since by so doing the relative positions of the trips 56 are changed and it is this that determines the length of time of the two dwells produced at each cycle of the machine.

The time in minutes and seconds of each cycle of the machine is determined by the worm-gears 34.

The complete operation of the present shift is described briefly as follows, assuming that power be applied to the shaft 13:

The worm members between the shaft 13 and the worm-wheels 44 drive the latter constantly in opposite directions, and the eccentrics 32 drive the arms 40 with a constant to and fro movement causing them to carry their oppositely-disposed pawls 42 back and forth above the shifters 48 and the timers 47 in the two groups. As each worm-wheel 44 carries its yieldingly-connected timer 47 around, once at each revolution the trip 56 attached to said timer drops off of the flange 58 on the now stationary shifter 48 in the same group, into the recess 59 in said flange, and permits the pawl 42 carried by the arm 40 in said group to engage the teeth 63 on said shifter and actuate the latter, with the result that the mechanism intervening between the shifter and the key 1 causes said key to be thrown in one direction. Directly thereafter the said trip 56 rides onto the flange 58 and thrusts the pawl 42 out of engagement with the teeth 63, so that the parts and members operated by the shifter 58 now being considered are permitted to remain stationary for a time. Then the other group of shifting elements acts to reverse the key 1. The last action or series of actions being the counterpart of those previously mentioned. And so each group operates in turn and the key 1 is thrown or turned in opposite directions, and permitted to dwell between each partial rotation thereof.

The gears between the shaft 15 and the key 1 determines, of course, the maximum amount of rotation given to said key.

Inasmuch as the shaft 15 does not, while the machine is in operation, make a complete revolution, it may better perhaps be termed a rock-shaft.

More or less change in the shape, size, construction, and arrangement of some or all of the parts of this machine may be made, without departing from the spirit of my invention or exceeding the scope of what is claimed.

In Fig. 8, the timer trip 56 is shown down in the recess 59, between the ends of the flange 58, in full lines, and up in closed relationship with the timer notch 50, in dotted lines, although said trip would not actually be in such closed position until after it had been carried by the timer 47 far enough to the right to cause the trip to be swung upwardly by the contiguous end portion of said flange. The pawl 42 is represented, by dot-and-dash lines, in engagement with the leading tooth 63 of the shifter 48, and with the tooth 62 of the timer 47, in Figs. 7 and 8, respectively.

Each trip 56 is provided with a heel 43 to ride on the flange 58 for said trip and prevent the latter from swinging outwardly or downwardly beyond the periphery of the timer 47 to which the trip is attached.

What I claim as my invention, and desire to secure by Letters Patent, is—

1. In an automatic shift, a loosely-mounted constantly-rotated member, a loosely-mounted, constantly-oscillating member provided with an actuating member, a normally-stationary shifting member, a rotative member with which said shifting member is rigidly connected, and means operated by said constantly-rotating member intermittently to cause said actuating member to engage and disengage said shifting member.

2. In an automatic shift, elements rotatable in opposite directions, means to rotate such elements constantly, normally stationary shifting means, a rotative element with which said shifting means are rigidly connected, constantly-moving means adapted for engagement with said shifting means, and means operated by said constantly-rotating elements intermittently to cause said constantly-moving means to engage and disengage said shifting means.

3. In an automatic shift, loosely-mounted constantly-rotated members, said members rotating in opposite directions, loosely-mounted constantly-oscillating members provided with actuating members, normally-stationary shifting members, a rotative member with which said shifting members are rigidly connected, and means operated by said constantly-rotating members intermittently to cause said actuating members to engage and disengage said shifting members alternately.

4. In an automatic shift, loosely-mounted constantly-rotated members, said members rotating in opposite directions, loosely-mounted constantly-oscillating members provided with actuating members, normally-stationary shifting members, a rotative member with which said shifting members are rigidly connected, means operated by said constantly-rotating members intermittently to cause said actuating members to engage and disengage said shifting members alternately, a shift element, and operating mechanism between said rotative member and such element.

5. In an automatic shift, loosely-mounted constantly-rotating members, said members rotating in opposite directions, loosely-mounted constantly-oscillating members provided with actuating members, normally-stationary shifting members, a rotative member with which said shifting members are rigidly connected, means operated by said constantly-rotating members intermittently to cause said actuating members to engage and disengage said shifting members alternately, and means to change the lengths of the intervals between the operations of said shifting members.

6. In an automatic shift, loosely-mounted constantly-rotating members, said members rotating in opposite directions, loosely-mounted constantly-oscillating members provided with actuating members, normally-stationary shifting members, a rotative member with which said shifting members are rigidly connected, means operated by said constantly-rotating members intermittently to cause said actuating members to engage and disengage said shifting members alternately, and means to change the time of the revolution of said constantly-rotating members.

7. In an automatic shift, loosely-mounted constantly-rotating members, said members rotating in opposite directions, loosely-mounted constantly-oscillating members provided with actuating members, normally-stationary shifting members, a rotative member with which said shifting members are rigidly connected, means operated by said constantly-rotating members intermittently to cause said actuating members to engage and disengage said shifting members alternately, means to change the time of the revolution of said constantly-rotating members, and means to change the lengths of the intervals between the operations of said shifting members.

8. In an automatic shift, a rock-shaft, means to connect said shaft with a shift element, revoluble members loosely mounted on said shaft, means to drive said members constantly in opposite directions, oscillatory members loosely mounted on said shaft, means to impart movement to said oscillatory members, normally-stationary shifting members secured to said shaft, said oscillatory members being provided with actuating members for said shifting members, means to retain said actuating members out of engagement with said shifting members, and means intermittently to permit said actuating members to engage said shifting members.

9. In an automatic shift, a rock-shaft, means to connect said shaft with a shift element, revoluble members loosely mounted on said shaft, means to drive said members constantly in opposite directions, oscillatory members loosely mounted on said shaft, means to impart movement to said oscillatory members, normally-stationary shifting members secured to said shaft, said oscillatory members being provided with actuating members for said shifting members, and loosely-mounted revoluble members yieldingly connected with said constantly-revolving members, and provided with members capable of thrusting said actuating members out of engagement with said shifting members, and permitting said actuating members to engage said shifting members, and the latter having means to control said actuating members carried by said yieldingly-connected revoluble members, whereby said actuating members are permitted to engage said shifting members, and are disengaged therefrom and retained in disengaged relation thereto.

10. In an automatic shift, a rock-shaft, hubbed rotary members loosely mounted on said shaft, means to drive said members constantly in opposite directions, notched timers loosely mounted on the hubs of said members and yieldingly-connected therewith, said timers being provided with trips adapted to close the notches in the timers, notched shifters secured to said shaft, and having recessed flanges adapted to retain said trips in closed position and permit the same to uncover the timer notches, and oscillatory arms loosely mounted on said shaft, and provided with oppositely-directed pawls which are permitted by said trips to engage the notched portions of said timers and shifters, for the purpose of actuating said timers and shifters, when said trips operate to uncover the notches in the timers, and are thrust out of such engagement, when said trips are actuated into closed position.

11. In an automatic shift, a rock-shaft, hubbed rotary members loosely mounted on said shaft, means to drive said members constantly in opposite directions, notched and stop-provided timers loosely mounted on the hubs of said members, and provided with trips adapted to close the notches in the timers, said members having pins to engage the timer stops, springs arranged to retain normally certain of said stops in contact with said pins, notched shifters secured to said shaft, and having recessed flanges adapted to retain said trips in closed position and permit the same to uncover the timer notches, and oscillatory arms loosely mounted on said shaft, and provided with oppositely-directed pawls which are permitted by said trips to engage the notched portions of said timers and shifters, for the purpose of actuating said timers against the resiliency of said springs, and for actuating said shifters, when said trips operate to uncover the notches in the timers, and are thrust out of such engagement, when said trips are actuated into closed position.

12. In an automatic shift, a rock-shaft, means to connect said shaft with a shift element, worm-wheels loosely-mounted on said shaft, a driving shaft provided with a worm, shafts provided with worm-gears to engage said worm, and with right- and left-hand worm-gears to engage said worm-wheels, oscillatory members loosely mounted on said shaft, means to impart movement to said oscillatory members, normally-stationary shifting members secured to said shaft, said oscillatory members being provided with actuating members for said shifting members, and loosely-mounted revoluble members yieldingly connected with said worm-wheels, and provided with members capable of thrusting said actuating members out of engagement with said shifting members, and permitting said actuating members to engage said shifting members, and the latter having means to control said actuating members carried by said yieldingly-connected revoluble members, whereby said actuating members are permitted to engage said shifting members, and are disengaged therefrom and retained in disengaged relation thereto.

13. In an automatic shift, a rock-shaft, means to connect said shaft with a shift element, revoluble members loosely mounted on said shaft, means to drive said members constantly in opposite directions, arms loosely mounted on said shaft, a driving shaft provided with eccentrics, rods between said eccentrics and said arms, normally-stationary shifting members secured to said shaft, said arms being provided with actuating members for said shift members, loosely-mounted revoluble members yieldingly connected with said constantly-revolving members, and provided with members capable of thrusting said actuating members out of engagement with said shifting members, and permitting said actuating members to engage said shifting members, and the latter having means to control said actuating members carried by said yieldingly-connected revoluble members, whereby said actuating members are permitted to engage said shifting members, and are disengaged therefrom and retained in disengaged relation thereto.

14. In an automatic shift, a rock-shaft, means to connect said shaft with a shift element, worm-wheels loosely mounted on said shaft, arms loosely mounted on said shaft, a driving shaft provided with a worm and with eccentrics, shafts provided with worm-gears which engage said worm, and with right- and left-hand worm-gears which engage said worm-wheels, rods connecting said eccentrics with said arms, normally-stationary shifting members secured to said shaft, said arms being provided with actuating members for said shifting members, loosely-mounted revoluble members yieldingly connected with said worm-wheels, and provided with members capable of thrusting said actuating members out of engagement with said shifting members, and permitting said actuating members to engage said shifting members, and the latter having means to control said actuating members carried by said yieldingly-connected revoluble members, whereby said actuating members are permitted to engage said shifting members, and are disengaged therefrom and retained in disengaged relation thereto.

15. In an automatic shift, a rock-shaft provided with a gear, a shift element provided with a gear, a shaft provided with gears to engage said rock-shaft and shift-element gears, revoluble members loosely mounted on said rock shaft, means to drive said members constantly in opposite directions, oscillatory members loosely mounted on said rock-shaft, means to impart movement to said oscillatory members, normally stationary shifting members secured to said rock shaft, said oscillatory members being provided with actuating members for said shifting members, loosely-mounted revoluble members yieldingly connected with said constantly-revolving members, and provided with members capable of thrusting said actuating members out of engagement with said shifting members, and permitting said actuating members to engage said shifting members, and the latter having means to control said actuating members carried by said yieldingly-connected revoluble members, whereby said actuating members are permitted to engage said shifting members, and are disengaged therefrom and retained in disengaged relation thereto.

16. In an automatic shift, a shaft, and two groups of members on said shaft, each of said groups comprising a normally-stationary shifter having a trip-engaging member, said shifter being secured to said shaft, a loosely-mounted timer and a loosely-mounted and constantly-rotating driver for said timer, the latter being yieldingly connected with the former, and being provided with a trip in the path of which is said trip-engaging member, and a loosely-mounted and constantly-oscillating arm provided with a pawl which extends over said shifter and timer, is controlled in its position by said trip, and is capable of operatively engaging said shifter and timer.

FREDERICK J. HEINE.

Witnesses:
F. A. CUTTER,
C. D. MONROE.